US005695732A

United States Patent [19]

Sparks et al.

[11] Patent Number: 5,695,732

[45] Date of Patent: Dec. 9, 1997

[54] METHOD FOR TREATING A HALOGENATED ORGANIC WASTE TO PRODUCE HALOGEN GAS AND CARBON OXIDE GAS STREAMS

[75] Inventors: Kevin A. Sparks, Scituate; James E. Johnston, Waltham, both of Mass.

[73] Assignee: Molten Metal Technology, Inc., Waltham, Mass.

[21] Appl. No.: 478,439

[22] Filed: Jun. 7, 1995

[51] Int. Cl.$^6$ .................... C01B 7/01; C01B 7/19; C01B 7/00

[52] U.S. Cl. .................... 423/418.2; 423/437 R; 423/481; 423/483; 423/500; 588/201

[58] Field of Search .................... 423/481, 437 R, 423/483, 500, 418.2; 588/201

[56] References Cited

U.S. PATENT DOCUMENTS

| | | | |
|---|---|---|---|
| 3,445,192 | 5/1969 | Woodland et al. | 423/437 R |
| 3,969,490 | 7/1976 | de Beuckelaer et al. | 423/481 |
| 4,246,255 | 1/1981 | Grantham | 423/659 |
| 4,337,368 | 6/1982 | Pytlewski et al. | 568/730 |
| 4,447,262 | 5/1984 | Gay et al. | 75/65 R |
| 4,469,661 | 9/1984 | Shultz | 423/210.5 |
| 4,497,782 | 2/1985 | Howell et al. | 423/184 |
| 4,552,667 | 11/1985 | Shultz | 210/757 |
| 4,574,714 | 3/1986 | Bach et al. | 10/346 |
| 4,602,574 | 7/1986 | Bach et al. | 110/346 |
| 5,015,457 | 5/1991 | Langhoff et al. | 423/481 |
| 5,084,264 | 1/1992 | Lyke | 423/502 |
| 5,177,304 | 1/1993 | Nagel | 588/201 |
| 5,191,154 | 3/1993 | Nagel | 588/201 |
| 5,298,233 | 3/1994 | Nagel | 423/DIG. 12 |
| 5,301,620 | 4/1994 | Nagel et al. | 110/346 |
| 5,435,982 | 7/1995 | Wilkinson | 423/437 R |
| 5,537,940 | 7/1996 | Nagel et al. | 423/418.2 |

FOREIGN PATENT DOCUMENTS

| | | |
|---|---|---|
| 817313 | 11/1974 | Belgium . |
| 55-73835 | 6/1980 | Japan . |
| WO 91/08023 | 6/1991 | WIPO . |
| WO 92/01492 | 2/1992 | WIPO . |
| WO 93/02750 | 2/1993 | WIPO . |
| WO 94/03237 | 2/1994 | WIPO . |

*Primary Examiner*—Wayne Langel

*Attorney, Agent, or Firm*—Hamilton, Brook, Smith & Reynolds, P.C.

[57] ABSTRACT

A method relates to treating a halogenated organic waste to produce halogen gas and carbon oxide gas streams. The method includes directing a halogenated organic waste, having a halogen-to-hydrogen atomic ratio of less than about one, into a molten metal bath. The molten metal bath is inert to the halogen and has a free energy of oxidation greater than that of the formation of carbon monoxide from atomic carbon. The halogenated organic feed is converted into halogen gas and atomic carbon, whereby the halogen gas is released from the molten metal bath. An oxidant is directed into the molten metal bath, whereby the atomic carbon is oxidized to form a carbon oxide gas, which is released from the molten metal bath.

59 Claims, 1 Drawing Sheet

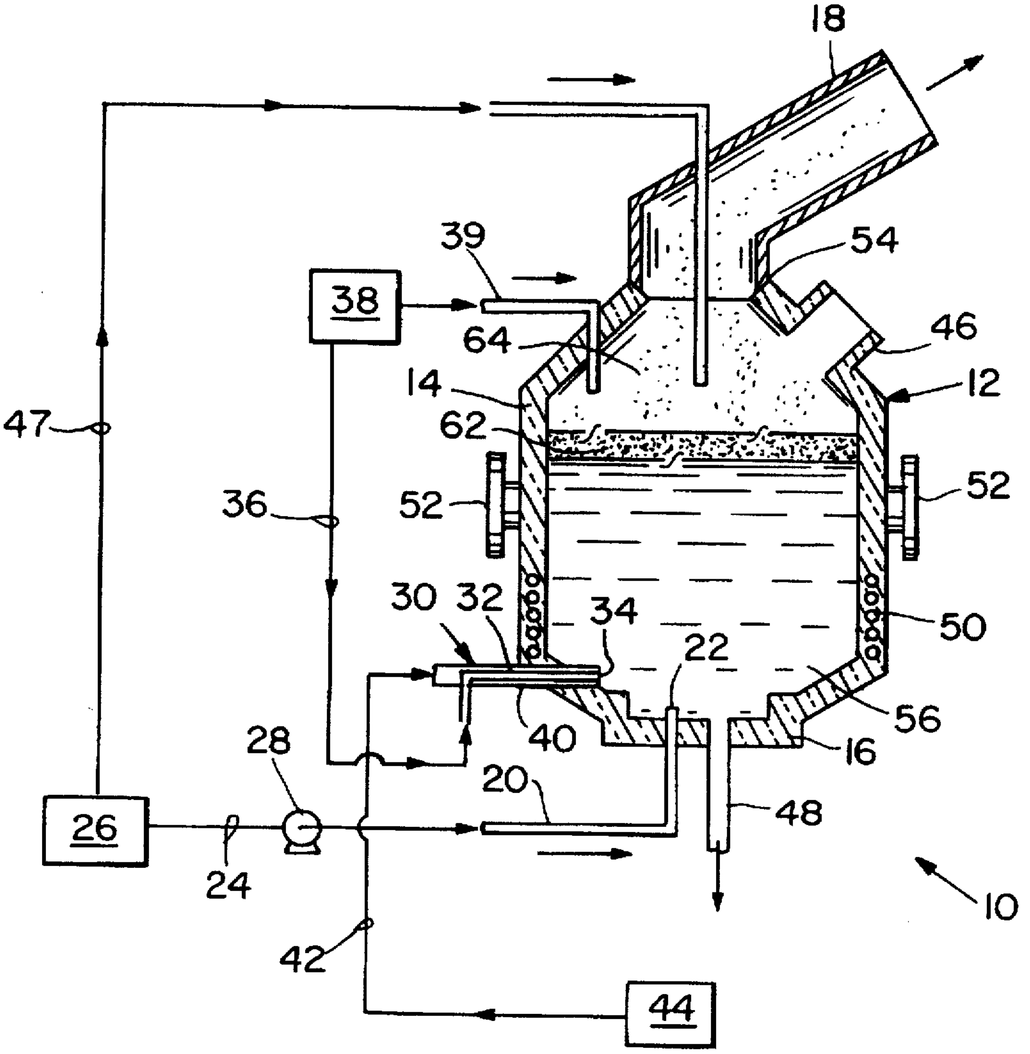
18
39
54
38
46
64
14
12
47
62
36
52
52
30
32
34
50
22
56
40
28
16
20
26
48
24
10
42
44

METHOD FOR TREATING A HALOGENATED ORGANIC WASTE TO PRODUCE HALOGEN GAS AND CARBON OXIDE GAS STREAMS

BACKGROUND OF THE INVENTION

Disposal of organic wastes in landfills and by incineration has become an increasingly difficult problem because of diminishing availability of disposal space, strengthened governmental regulations, and the growing public awareness of the impact of hazardous substance contamination upon the environment. Release of hazardous organic wastes to the environment can contaminate air and water supplies, thereby diminishing the quality of life in the affected populations.

To minimize the environmental effects of the disposal of organic wastes, methods must be developed to convert these wastes into benign, and preferably, useful substances. In response to this need, there has been a substantial investment in the development of alternate methods for suitably treating hazardous organic wastes. One of the most promising new methods is described in U.S. Pat. Nos. 4,574,714 and 4,602,574, issued to Bach and Nagel. The Bach/Nagel method for destroying organic material, including toxic wastes, involves decomposition of the organic material to its atomic constituents in a molten metal bath and reformation of these atomic constituents into environmentally acceptable products, including hydrogen, carbon monoxide and/or carbon dioxide gases.

However, some hazardous wastes, particularly hazardous organic wastes, include substantial amounts of halogens, such as chlorine. Examples of highly chlorinated hazardous organics include polychlorinated biphenyls (PCBs) and dioxins. Halogenated organic wastes are difficult to incinerate because halogens released by destruction of the organic component of the waste are very reactive and typically form additional toxic compounds which are subject to regulation.

Therefore, a need exists for a method for treating a halogenated organic waste which minimizes or eliminates the above-referenced problems.

SUMMARY OF THE INVENTION

The present invention relates to processing a halogenated organic waste to produce hydrogen halide gas and carbon oxide gas steams.

The method includes directing a halogenated organic waste, having a halogen-to-hydrogen atomic ratio of less than about one, into a molten metal bath. The molten metal bath is inert to the halogen and has a free energy of oxidation greater than that of the formation of a carbon oxide from atomic carbon. The halogenated organic waste is converted into hydrogen halide gas and atomic carbon, whereby the hydrogen halide gas is released from the molten metal bath. An oxidant is directed into the molten metal bath, whereby the atomic carbon is oxidized to form a carbon oxide gas, which is released from the molten metal bath.

Another embodiment of the invention includes directing a halogenated organic waste, having a halogen-to-hydrogen atomic ratio of greater than about one into a molten metal bath, the molten metal bath being inert to the halogen and having a free energy of oxidation less than that of the formation of a carbon oxide from atomic carbon. The halogenated organic feed is converted into atomic halogen and atomic carbon, whereby the halogen is dissolved in the molten metal bath. An oxidant is directed into the molten metal bath, whereby the atomic carbon is oxidized to form a carbon oxide gas, which is released from the molten metal bath. A reductant is directed into the molten metal bath, whereby the atomic halogen is reduced to form a hydrogen halide, which is released from the molten metal bath.

This invention has many advantages. For example, hazardous wastes which include highly-halogenated organic components can be treated without releasing significant amounts of halogenated toxic compounds to the atmosphere. In addition, these wastes can be treated without forming halogen-containing solids, such as ash or salts, which require containment because of their halogen content. Further, this invention has the advantage of forming a halogen gas stream, such as a hydrogen chloride or chlorine gas stream. Chlorine gas is useful as a raw material for the manufacture of many chemicals, such as carbon tetrachloride, trichloroethylene, polyvinyl chloride, metallic chlorides, etc. Consequently, the halogen component of halogenated hazardous organic wastes can be recycled to form useful industrial raw materials.

BRIEF DESCRIPTION OF THE DRAWING

The FIGURE is a schematic representation of a system suitable for forming a halogen gas stream and a carbon oxide gas stream from a halogenated organic waste in a molten metal bath according to the method of this invention.

DETAILED DESCRIPTION OF THE INVENTION

The features and other details of the method of the invention will now be more particularly described with reference to the accompanying drawing and pointed out in the claims. It will be understood that the particular embodiments of the invention are shown by way of illustration and not as limitations of the invention. The principle features of this invention can be employed in various embodiments without departing from the scope of the invention. All parts and percentages are by weight unless otherwise specified.

The present invention generally relates to a method for treating halogenated organic waste for producing halogen gas and carbon oxide gas steams, such as chlorine and syngas, respectively. This invention is an improvement of the Bach/Nagel method disclosed in U.S. Pat. Nos. 4,574,714 and 4,602,574, the teachings of which are incorporated herein by reference in its entirety.

One embodiment of an apparatus which is suitable for conducting the method of the invention is illustrated in the FIGURE. Apparatus 10 includes reactor 12. Examples of suitable reactors include appropriately modified steelmaking vessels known in the art, such as K-BOP, Q-BOP, argon-oxygen decarburization furnaces (AOD), BOP, etc. Another suitable reactor is disclosed in U.S. Pat. No. 5,301,620, the teachings of which are incorporated herein by reference in their entirety. Reactor 12 includes upper portion 14 and lower portion 16. Off-gas outlet 18 extends from upper portion 14 and is suitable for conducting an off-gas composition out of reactor 12. Reactor 12 can have a refractory lining, such as aluminum oxide, graphite or other suitable material known in the art.

Halogenated organic waste inlet tube 20 includes halogenated organic waste inlet 22 and extends from lower portion 16 of reactor 12. Line 24 extends between halogenated organic waste source 26 and halogenated organic waste inlet tube 20. Pump 28 is disposed in line 24 for directing halogenated organic waste from halogenated organic waste source 26 through halogenated organic waste inlet tube 20 and into molten metal contained in reactor 12.

Tuyere 30 is disposed at lower portion 16 of reactor 12. Tuyere 30 includes oxidant tube 32 for injection of a separate oxidant at oxidant inlet 34. Line 36 extends between oxidant tube 32 and oxidant source 38. Outer tube 40 of tuyere 30 is disposed concentrically about oxidant tube 32 at oxidant inlet 34. Line 42 extends between outer tube 40 and shroud gas source 44 for conducting a suitable shroud gas from shroud gas source 44 through the concentric opening between outer tube 40 and oxidant tube 32 to oxidant inlet 34.

It is to be understood, however, that more than one halogenated organic waste tube or more than one oxidant tube, or combinations thereof, can be disposed at the lower portion of reactor 12 for introduction of halogenated organic waste and an oxidant into reactor 12. The halogenated organic waste tube and oxidant tube can be concentric, for alternate injection, or at locations in reactor 12 which are remote from each other, for simultaneous introduction of waste and oxidant. Suitable halogenated organic waste can also, optionally, be introduced into reactor 12 through port 46 or conducted from halogenated organic waste source 26 through line 47 to reactor 12 or both. Other means, such as an injection lance (not shown) can also be employed to introduce halogenated organic waste into the molten metal in reactor 12.

Bottom tapping spout 48 extends from lower portion 16 of reactor 12 and is suitable for removal of the molten metal from reactor 12.

Induction coil 50 is disposed at lower portion 16 for heating molten metal bath 56 in reactor 12. It is to be understood that, alternatively, reactor 12 can be heated by other suitable means, such as by oxyfuel burners, electric arcs, etc.

Trunions 52 are disposed at reactor 12 for manipulation of reactor 12. Seal 54 is disposed between off-gas outlet 18 and port 46 and is suitable for allowing partial rotation of reactor 12 about trunions 52 without breaking seal 54.

Molten metal bath 56 is within reactor 12. Molten metal bath 56 is formed by at least partially filling reactor 12 with a suitable metal. The metal is then heated to a suitable temperature by activation of induction coil 52 or by other suitable means, not shown. Suitable metals are those with melting points below the operating conditions of the system. Generally, the viscosity of molten metal bath 56 in reactor 12 is less than about ten centipoise at the operating conditions of reactor 12. Molten metal bath 56 can include more than one metal. For example, molten metal bath 56 can include a solution of miscible metals, such as nickel and copper.

Molten metal bath 56 does not react with chlorine or other halogens to form a salt and is considered inert to halogens at the operating conditions including temperature, pressure and molar concentration of the components in molten metal bath 56 in apparatus 10. In one embodiment, molten metal bath 56 includes a metal having a free energy of oxidation, at the operating conditions of system 10, which is greater than that of atomic carbon to carbon monoxide. Also, the molten metal in the molten metal bath is under conditions such that the molten metal does not appreciably form a salt in the presence of the halogen of the halogenated organic waste. These metals can include gold, nickel, copper and cobalt. Also, in some instances, such as with a copper molten bath, a small amount of a second metal or an inorganic, such as sulfur, is added to the bath to inhibit the formation of dioxin in the presence of excess oxygen.

Further, molten metal bath 56 can have significant carbon solubility to allow carbon to dissolve and accumulate in the bath while halogen gas is being formed. Accumulation of dissolved carbon in the molten metal bath causes a halogen-containing gas stream to be generated that includes only small amounts of carbon, if any. Thus, metals with a carbon solubility of greater than about 0.003 percent, by weight, are preferred, and those with a carbon solubility of greater than about one percent, by weight, are particularly preferred. In the cases where more than one metal is employed, at least one of the metals should have the aforementioned carbon solubility. The preferred metals have a greater free energy of formation of their metal halides under the operating conditions of the bath than the free energy of formation of the desired halogen product.

Optionally, molten metal bath 56 includes vitreous, or slag, layer 62. Vitreous layer 62, which is disposed on molten metal bath 56, is substantially immiscible with molten metal bath 56. Vitreous layer 62 can have a lower thermal conductivity than that of molten metal bath 56. Radiant heat loss from molten metal bath 56 can thereby be reduced to significantly below the radiant heat loss from molten metal bath 56 where no vitreous layer is present.

Typically, vitreous layer 62 includes at least one metal oxide having a free energy of oxidation, at the operating conditions of system 10, which is less than that for the oxidation of atomic carbon to carbon monoxide.- An example of a suitable metal oxide is calcium oxide (CaO).

Suitable operating conditions of system 10 include a temperature sufficient to at least partially convert the halogenated organic waste by decomposition to halogen, carbon and the other atomic constituents. Generally, a temperature in the range of between about 1,300° and 1,700° C. is suitable.

A wide variety of halogenated organic wastes is suitable for treatment by the method of this invention. An example of a suitable halogenated organic waste includes a halogen-containing carbonaceous composition, which includes dioxins, PCBs, etc. It is to be understood that the halogenated organic waste can include inorganic compounds. In addition to carbon and at least one halogen, the halogenated organic waste can include other atomic constituents, such as hydrogen, metals, nitrogen, sulfur, oxygen, etc. In one embodiment, for the production of a greater yield of enriched elemental halogen gas, such as chlorine gas ($Cl_2$), a preferred halogenated organic waste includes a relatively highly halogenated containing carbonaceous waste, such as tetrachloroethane, hexachloroethane, hexachlorobenzene, etc. These compounds have a halogen-to-hydrogen atomic ratio of greater than about one.

The method includes directing halogenated organic waste is directed from halogenated organic waste source 26 through line 24 by pump 28 and injecting the waste into molten metal bath 56 through halogenated organic waste tube 20. In one embodiment, the halogenated organic waste is a fluid which can include organic waste components dissolved or suspended within a liquid. In another embodiment, solid particles of halogenated organic waste components are suspended in an inert gas, such as argon.

Halogenated organic waste directed into molten metal bath 56 is dissociated to its atomic constituents. If hydrogen is present in the halogenated organic waste, a hydrogen halide gas is formed. By employing a halogenated organic waste with a halogen to hydrogen ratio of greater than about one, the formation of a halogen gas is enabled. However, the hydrogen halide can be recovered from the off-gas stream by scrubbing the off-gas stream with, for example, water.

The carbon from the dissociated waste can carburize the molten metal bath. The term, "carburize," as used herein, means the inclusion of atomic carbon in a molten metal bath to increase the amount of carbon in the molten metal bath without any substantial loss of carbon from the molten metal due to oxidation by a separately added oxidant. The carbon can be dissolved in the metal. In one embodiment, the atomic carbon forms a complex with the metal. The atomic halogen is then formed into an elemental halogen gas. For example, atomic chlorine (Cl) will be converted to chlorine gas ($Cl_2$).

A molten metal is considered having a high carbon solubility if the percentage of carbon is dissolvable in the metal is about one percent or greater, by weight. A low carbon solubility is considered to be a concentration of about 0.5 percent or less, by weight. Preferably, the carbon concentration is about 0.5 percent, more preferably 0.1 percent and most preferably 0.05 percent. In one embodiment, the molten metal bath includes nickel having a concentration of carbon in the range of between about 0.01 and 0.02 percent. An advantage of operating at such a low concentration of carbon includes minimizing refractory lining wear in the presence of a halogen because the halogen, such as chlorine, can be reactive with a refractory material, such as aluminum oxide. A high concentration of carbon in a metal is consideration an amount of carbon at or about the carbon saturation point.

The halogen gas migrates through molten metal bath 56 by diffusion or bubbling, for example, and accumulates above molten metal bath 56. At least a portion of the halogen migrates above molten metal bath 56 to a portion of reactor 12 proximate to off-gas outlet 18 to form an enriched-halogen gas stream. An enriched-halogen gas stream, as that term is used herein, means a gas stream wherein the molar fraction of halogen gas contained in the gas stream is greater than that generally produced in a typical process disclosed by Bach/Nagel in U.S. Pat. Nos. 4,574,714 and 4,602,574 for the simultaneous, combined decomposition and oxidation of an organic waste. The molar fraction of elemental halogen is the ratio of the moles of elemental halogen contained in a gas stream to the sum of the moles of elemental halogen and moles of carbon oxide gases contained in the gas stream. The formed elemental halogen gas can be removed from the gas stream by a suitable method, such as a scrubber or membrane separation.

The concentration of dissolved carbon in molten metal bath 56 is preferably limited to an amount below the saturation point for carbon at the temperature of molten metal bath 56. Where for example, molten metal bath 56 is nickel, the saturation point of carbon is in the range of between about 2.2 percent at 1,400° C. and about 2.5 percent, by weight, at 1,800° C. Similarly, for copper, the saturation point of carbon is in the range of between about 0.001 percent at 1,400° C. and about 0.005 percent, by weight, at 1,800° C.

For high carbon solubility molten metals, such as nickel, cobalt and tungsten, the reactor may preferably be operated at low concentration of carbon. For low carbon solubility molten metals, such as copper and zirconium, the reactor may preferably be operated at a high carbon concentration.

If carbon contained in the molten metal becomes insoluble because the molten metal is saturated with carbon, the insoluble portion of the carbon may become entrained in the enriched halogen gas stream and thereby be removed from the molten metal through off-gas outlet 18. If this occurs, suitable apparatus, such as that known in the art, can be used to separate the entrained carbon dust from the halogen gas stream. Examples of suitable apparatus include a cyclone separator or baghouse filter.

Oxidant is directed into molten metal bath 56 to react with dissolved carbon in molten metal bath 56 and thereby form a carbon oxide gas. Examples of suitable oxidants include oxygen gas ($O_2$), air, etc. In one embodiment, oxidant is directed into molten metal bath 56 through oxidant inlet tube 32. Oxidant inlet tube 32 is at a location within reactor 12 that is sufficiently remote from waste inlet tube 20 to cause halogen gas to escape and dissolution of carbon in molten metal bath 56, before reaction of carbon from the waste with the oxidant. Remote injection of the oxidant causes formation of distinct halogen-enriched and carbon oxide-enriched gas streams during concurrent injection of the halogenated organic waste and oxidant in molten metal bath 56.

A "carbon oxide-enriched gas stream," as that term is used herein, means a gas stream wherein the molar fraction of carbon oxide gas contained in the gas stream, based upon the total amount of halogen and carbon oxide in the gas streams, is greater than that generally produced in a typical process disclosed by Bach/Nagel in U.S. Pat. Nos. 4,574,714 and 4,602,574. The molar fraction of carbon oxide gas is the ratio of the moles of carbon oxide gas contained in a gas stream to the sum of the moles of halogen and moles of carbon oxide gases contained in the gas stream.

Alternatively, the halogenated organic waste and the oxidant can be fed into molten metal bath 56 at the same location, or proximate locations, within reactor 12, but at alternating intervals, to obtain distinct halogen-enriched and carbon oxide-enriched gas streams. The alternating intervals are sufficiently spaced to cause carbon dissolution and escape of halogen gas from molten metal bath 56 following halogenated organic waste injection, and escape of carbon oxide gas from molten metal bath following oxidant injection. During either remote or alternate injection of waste and oxidant, it is to be understood that the halogenated organic waste also includes an oxidant. It is also to be understood that the halogenated organic waste and oxidant can be directed into molten metal bath 56 continuously and conjointly.

The carbon oxide gas composition ratio of carbon monoxide to carbon dioxide can be adjusted by a number of techniques. One such technique relates to the choice of the metal or metals employed to form molten metal bath 56. For example, molten iron tends to cause carbon monoxide to be produced, whereas molten copper tends to allow an increased amount of carbon dioxide to be produced and released from molten metal bath 56.

Optionally, a combination of immiscible molten metals in molten metal bath 56 can be employed. For example, U.S. Pat. No. 5,177,304, issued to Christopher J. Nagel on Jan. 5, 1993 discloses a method and system for increasing the formation of carbon dioxide from carbonaceous waste in a molten bath of immiscible metals. The teachings of U.S. Pat. No. 5,177,304 are hereby incorporated by reference in their entirety. As taught therein, an increased amount of carbon dioxide can be produced from a molten metal bath which has two immiscible molten metals wherein the first has a free energy of oxidation greater than that for oxidation for atomic carbon to carbon monoxide and the second has a free energy of oxidation greater than that for oxidation of carbon monoxide to form carbon dioxide.

The invention described herein is not limited to the above-described embodiments. For example, an alternative embodiment can include introducing the halogenated organic waste into the molten metal without the addition of a separate oxidant and under conditions sufficient to decompose the halogenated organic waste, whereby the molten metal is carburized and an enriched halogen gas stream is formed. The carburized metal can then be solidified. At a later time, the carburized metal can be melted, and a separate oxidant can then be added into the carburized metal to oxidize carbon contained in the carburized molten metal to thereby form an enriched carbon oxide gas stream.

The invention will now be described by the following illustrations.

ILLUSTRATION I

A halogenated organic compound chloromethane, is fed into a system, such as that shown in the FIGURE. Molten metal bath 56 includes nickel metal with one percent dissolved carbon and is at a temperature of 1,400° C. Concurrently, an oxidant, such as oxygen gas, is fed into the molten metal. The halogenated organic composition is dissociated and reformed into carbon monoxide gas, hydrogen gas, and hydrogen chloride gas. Carbon monoxide is formed preferentially to the metal oxide of the metal or carbon dioxide because the free energies of oxidation of carbon dioxide and nickel oxide are greater than the free energy of oxidation for carbon to carbon monoxide. The carbon monoxide, hydrogen gas and hydrogen chloride gas are separated from the molten metal through the off-gas outlet which can be directed to separation means, such as a pressure swing absorption, for forming separate streams of carbon monoxide gas and hydrogen gas. The hydrogen chloride can be recovered from the gaseous effluent with water, for example, in a suitable hydrogen chloride absorber unit.

ILLUSTRATION II

A halogenated organic composition including chlorine and carbon, such as hexachlorobenzene, is fed into a suitable system, such as that shown in the FIGURE. The metal of molten metal bath 56 includes gold at a temperature of 1,200° C. The halogenated composition is decomposed to its atomic constituents, including chlorine and carbon in the molten metal. Chlorine gas is formed and removed from reactor 10 through off-gas outlet 18 as an enriched chlorine gas stream. Molten metal bath 56 is simultaneously carburized.

After removing the chlorine gas, an oxidant oxygen gas is then added to the carburized molten metal in the system. The reaction of carbon with the oxidant occurs preferentially to the oxidation of the gold in the molten metal because the free energy of oxidation of carbon is lower than that of the gold at the temperature of the molten metal. Carbon preferentially forms carbon oxide to gold oxide or carbon dioxide because the free energies of oxidation of carbon dioxide and gold are greater than the free energy of oxidation for carbon to form carbon monoxide. Oxygen gas is added until carbon is removed from molten metal bath 56. The carbon monoxide is sufficiently separated from the molten metal through the off-gas outlet and can then be directed to a carbon oxide collection tank, not shown, or vented to the atmosphere.

ILLUSTRATION III

Halogenated dioxin is fed into a nickel bath at a temperature of about 1,600° C. The carbon concentration of the nickel bath is about 0.01 percent, while substantial oxygen is dissolved in the bath, about 0.5 percent oxygen. The halogenated organic composition is dissociated and reformed into a mixture of carbon monoxide, carbon dioxide, hydrogen gas, hydrogen chloride and water vapor. The dissolved oxygen in the molten bath is maintained by cofeeding $CO_2$ into the bath. The hydrogen chloride and water vapor are recovered from the gas by way of a water absorber, carbon monoxide and hydrogen gas is used as a feed stock for chemical synthesis production. Alternatively, the carbon monoxide and hydrogen gas can be used as a fuel within a chemical manufacturing plant. Carbon dioxide is recycled to the bath.

ILLUSTRATION IV

Polychlorinated biphenyls (PCBs) are fed into a molten cobalt bath at about 1,600° C. Initially, the carbon content of the molten bath is slightly greater than about 0.1 percent, PCB waste is fed without a coreactant, thereby allowing carbon to accumulate in the bath, while hydrogen gas and hydrogen chloride are formed within the bath and exit as a gas stream. As carbon solubility approaches saturation, waste injected is stopped and oxygen gas injection is commenced. The oxygen gas reacts with the dissolved carbon to form carbon monoxide, which exists as a gas stream. As accumulated carbon in the bath is depleted to slightly greater than about 0.1 percent, oxygen gas injection is ceased and PCB injection is recommenced. This establishes an operational cycle which is repeated. Product carbon monoxide is separated from the hydrogen gas and hydrogen chloride stream by sequentially directing the flows to different product tanks. Hydrogen gas is separated from hydrogen chloride by use of membrane separation, thereby resulting in separate product gas streams.

ILLUSTRATION V

Hexafluoroethane waste is injected into a molten zinc bath at a temperature of about 1,000° C. and twenty-five bar pressure. The fluorine dissolves in the metal bath forming a fluorine retaining metal phase. Oxygen is concurrently injected into the metal bath to form carbon monoxide.

As fluorine reaches its solubility limit in zinc, waste injection and oxygen injection are ceased and hydrogen gas is injected as a reductant to reduce the dissolved fluorine to metallic zinc, while forming a hydrogen fluoride stream that exits to the gas phase. As fluorine is nearly depleted from the molten metal bath, hydrogen gas injection is ceased and waste and oxygen gas injection is recommenced. This establishes a processing cycle which can be continually repeated.

EQUIVALENTS

Those skilled in the art will recognize, or be able to ascertain using no more than routine experimentation, many equivalents to the specific embodiments of the invention described specifically herein. Such equivalents are intended to be encompassed in the scope of the claims.

We claim:

1. A method for processing a halogenated organic feed to produce a hydrogen halide gas and carbon oxide gas streams, comprising the steps of:

a) directing a halogenated organic feed, having a halogen-to-hydrogen atomic ratio of less than about one into a molten metal bath, said molten metal bath being inert to said halogen and having a free energy of oxidation greater than that of the formation of a carbon oxide from atomic carbon, said halogenated organic feed being converted into a hydrogen halide gas and atomic carbon, whereby said hydrogen halide gas is released from the molten metal bath; and b) directing an oxidant into the molten metal bath, whereby the atomic carbon is oxidized to form a carbon oxide gas which is released from the molten metal bath, thereby processing the halogenated organic feed to produce hydrogen halide and carbon oxide gas streams.

2. The method of claim 1 wherein the injection of oxidant into the molten metal bath is separate from that of the halogenated organic feed, whereby an enriched hydrogen halide gas stream is formed and, separately, an enriched carbon oxide gas stream is formed.

3. The method of claim 2 wherein the halogenated organic feed and the oxidant are alternately directed into the molten metal bath.

4. The method of claim 1 wherein the oxidant is directed into the molten metal bath at a location which is remote from that of the halogenated organic feed, and distinct streams of carbon oxide gas and hydrogen halide gas are formed concurrently.

5. The method of claim 1 wherein the halogen of the halogenated organic feed includes chlorine.

6. The method of claim 1 wherein the halogen of the halogenated organic feed is selected from the group consisting of fluorine, bromine and iodine.

7. The method of claim 1 wherein the carbon oxide gas stream includes carbon monoxide.

8. The method of claim 1 wherein the carbon oxide gas stream includes carbon dioxide.

9. The method of claim 1 wherein the hydrogen halide includes hydrogen chloride.

10. The method of claim 1 wherein the hydrogen halide is selected from the group consisting of hydrogen fluoride, hydrogen bromide and hydrogen iodide.

11. The method of claim 1 wherein the hydrogen halide gas stream further includes a halogen gas selected from a group consisting of chlorine gas, fluorine gas, bromine gas and iodine gas.

12. The method of claim 1 wherein the hydrogen halide gas further includes hydrogen gas.

13. The method of claim 1 wherein the oxidant includes oxygen gas.

14. The method of claim 1 wherein the oxidant includes carbon dioxide or water.

15. The method of claim 1 wherein the molten metal bath includes a molten metal selected from the group consisting of gold, nickel, copper and cobalt.

16. The method of claim 1 wherein the atomic carbon is soluble in the molten metal.

17. The method of claim 16 wherein the carbon concentration of the molten metal bath is about 0.5 percent.

18. The method of claim 16 wherein the carbon concentration of the molten metal bath is about 0.1 percent.

19. The method of claim 16 wherein the carbon concentration of the molten metal bath is about 0.05 percent.

20. The method of claim 1 wherein said molten metal bath includes a graphite refractory lining.

21. The method of claim 1 wherein atomic chlorine is soluble in the molten metal.

22. The method of claim 1 wherein the halogenated organic feed includes chloroethane.

23. The method of claim 1 wherein the halogenated organic feed includes chlorobenzene.

24. The method of claim 1 wherein the halogenated organic feed includes dioxin.

25. The method of claim 1 wherein the halogenated organic feed includes polychlorinated biphenyls.

26. The method of claim 1 wherein the molten metal bath comprises a first metal, which has a free energy of oxidation that is greater than that of oxidation of atomic carbon to form carbon monoxide, and a second metal, which has a free energy of oxidation that is greater than that of oxidation of carbon monoxide to form carbon dioxide.

27. The method of claim 1 wherein the metal of the molten metal bath has a free energy of oxidation greater than that of the oxidation of carbon monoxide to form carbon dioxide.

28. A method for treating a halogenated organic feed to produce hydrogen halide gas and carbon oxide gas streams, comprising the steps of:

a) directing a halogenated organic feed, having a halogen-to-hydrogen atomic ratio of less than about one into a molten nickel bath, said molten nickel bath being inert to said halogen under the conditions of the nickel molten bath and having a free energy of oxidation greater than that of the formation of a carbon oxide from atomic carbon, said halogenated organic feed being converted into a hydrogen halide gas and atomic carbon, whereby said hydrogen halide gas is released from the molten nickel bath while maintaining a low concentration of carbon in the nickel metal bath; and b) directing an oxidant into the molten nickel bath, whereby the atomic carbon is oxidized to form a carbon oxide gas which is released from the molten nickel bath, thereby processing the halogenated organic feed to produce the hydrogen halide and carbon oxide gas streams.

29. A method for treating a halogenated organic feed to produce hydrogen halide gas and carbon oxide gas streams, comprising the steps of:

a) directing a halogenated organic feed, having a halogen-to-hydrogen atomic ratio of less than about one into a molten nickel bath, said molten nickel bath being inert to said halogen under the conditions of the nickel metal bath and having a free energy of oxidation greater than that of the formation of a carbon oxide from atomic carbon, said halogenated organic feed being converted into a hydrogen halide gas and atomic carbon, whereby said hydrogen halide gas is released from the molten nickel bath while maintaining a high concentration of carbon in the nickel metal bath; and b) directing an oxidant into the molten metal bath, whereby the atomic carbon is oxidized to form a carbon oxide gas which is released from the molten nickel bath, thereby treating the halogenated organic feed to produce hydrogen halide and carbon oxide gas streams.

30. A method for treating a halogenated organic feed to produce hydrogen halide gas and carbon oxide gas streams, comprising the steps of:

a) directing a halogenated organic feed, having a halogen-to-hydrogen atomic ratio of less than about one into a molten copper bath, said molten copper bath being inert to said halogen under the conditions of the molten copper bath and having a free energy of oxidation greater than that of the formation of a carbon oxide from atomic carbon, said halogenated organic feed being converted into a hydrogen halide gas and atomic carbon, whereby said hydrogen halide gas is released from the molten copper bath while maintaining a high concentration of carbon in the copper bath; and b) directing an oxidant into the molten copper bath, whereby the atomic carbon is oxidized to form a carbon oxide gas which is released from the molten copper bath, thereby treating the halogenated organic feed to produce hydrogen halide and carbon oxide gas streams.

31. The method of claim 30 wherein the molten copper bath further includes nickel.

32. The method of claim 31 wherein the nickel is about one percent, by weight, of the copper-nickel bath.

33. A method for processing a halogenated organic feed to produce a halogen gas and carbon oxide gas streams, comprising the steps of:

a) directing a halogenated organic feed, having a halogen-to-hydrogen atomic ratio of greater than about one into a molten metal bath, said molten metal bath being inert to said halogen and having a free energy of oxidation greater than that of the formation of a carbon oxide from atomic carbon, said halogenated organic feed being converted into a halogen gas and atomic carbon, whereby said halogen gas is released from the molten metal bath; and b) directing an oxidant into the molten metal bath, whereby the atomic carbon is oxidized to form a carbon oxide gas which is released from the molten metal bath, thereby processing the halogenated organic feed to produce halogen gas and carbon oxide gas streams.

34. The method of claim 33 wherein the injection of oxidant into the molten metal bath is separate from that of the halogenated organic feed, whereby an enriched halogen gas stream is formed and, separately, an enriched carbon oxide gas stream is formed.

35. The method of claim 33 wherein the halogenated organic feed and the oxidant are alternately directed into the molten metal bath.

36. The method of claim 33 wherein the oxidant is directed into the molten metal bath at a location which is remote from that of the halogenated organic feed, and distinct streams of carbon oxide gas and hydrogen halide gas are formed concurrently.

37. The method of claim 33 wherein the halogen of the halogenated organic feed includes chlorine.

38. The method of claim 33 wherein the halogen of the halogenated organic feed is selected from the group consisting of fluorine, bromine and iodine.

39. The method of claim 33 wherein the carbon oxide gas stream includes carbon monoxide.

40. The method of claim 33 wherein the carbon oxide gas stream includes carbon dioxide.

41. The method of claim 33 wherein the halogen gas is selected from a group consisting of chlorine gas, fluorine gas, bromine gas and iodine gas.

42. The method of claim 33 wherein the oxidant includes oxygen gas.

43. The method of claim 33 wherein the oxidant includes carbon dioxide or water.

44. The method of claim 33 wherein the molten metal bath includes a molten metal selected from the group consisting of gold, nickel, copper and cobalt.

45. The method of claim 33 wherein the atomic carbon is soluble in the molten metal.

46. The method of claim 33 wherein the atomic carbon concentration of the molten metal bath is about 0.5 percent.

47. The method of claim 33 wherein the atomic carbon concentration of the molten metal bath is about 0.1 percent.

48. The method of claim 33 wherein the atomic carbon concentration of the molten metal bath is about 0.05 percent.

49. The method of claim 33 wherein said molten metal bath includes a graphite refractory lining.

50. The method of claim 33 wherein atomic chlorine is soluble in the molten metal.

51. The method of claim 33 wherein the halogenated organic feed includes tetrachloroethane.

52. The method of claim 33 wherein the halogenated organic feed includes hexachlorobenzene.

53. The method of claim 33 wherein the halogenated organic feed includes dioxin.

54. The method of claim 33 wherein the halogenated organic feed includes polychlorinated biphenyls.

55. The method of claim 33 wherein the molten metal bath comprises a first metal, which has a free energy of oxidation that is greater than that of oxidation of atomic carbon to form carbon monoxide, and a second metal, which has a free energy of oxidation that is greater than that of oxidation of carbon monoxide to form carbon dioxide.

56. The method of claim 33 wherein the metal of the molten metal bath has a free energy of oxidation greater than that of the oxidation of carbon monoxide to form carbon dioxide.

57. A method for processing a halogenated organic feed to produce a hydrogen halide gas and carbon oxide gas streams, comprising the steps of:

a) directing a halogenated organic feed, having a halogen-to-hydrogen atomic ratio of greater than about one into a molten metal bath, said molten metal bath being inert to said halogen and having a free energy of oxidation greater than that of the formation of a carbon oxide from atomic carbon, said halogenated organic feed being converted into atomic halogen and atomic carbon, whereby said halogen is dissolved in the molten metal bath;

b) directing an oxidant into the molten metal bath, whereby the atomic carbon is oxidized to form a carbon oxide gas, which is released from the molten metal bath; and c) directing a reductant into the molten metal bath, whereby the atomic halogen is reduced to form a hydrogen halide which is released from the molten metal bath, thereby processing the halogenated organic feed to produce hydrogen halide and carbon oxide gas streams.

58. The method of claim 57 wherein the reductant includes hydrogen gas.

59. The method of claim 57 wherein the molten metal bath includes zinc.

* * * * *